(No Model.)

G. H. & J. G. PARKER.
CULTIVATOR.

No. 556,277. Patented Mar. 10, 1896.

Witnesses
John C. Shaw
V. B. Hillyard

Inventors
George H. Parker and
John G. Parker,
By their Attorneys,
C. A. Snow & Co.

UNITED STATES PATENT OFFICE.

GEORGE H. PARKER AND JOHN G. PARKER, OF WOODLAND, NORTH CAROLINA.

CULTIVATOR.

SPECIFICATION forming part of Letters Patent No. 556,277, dated March 10, 1896.

Application filed March 16, 1895. Serial No. 542,051. (No model.)

*To all whom it may concern:*

Be it known that we, GEORGE H. PARKER and JOHN G. PARKER, citizens of the United States, residing at Woodland, in the county of Northampton and State of North Carolina, have invented a new and useful Cultivator, of which the following is a specification.

The present invention aims to provide a cultivator in which the standards carrying the cultivator-shovels can be adjusted laterally within certain limits and at all times maintain a relatively parallel relation, and in which the said standards can be tilted to regulate the pitch of the shovels to adapt the implement to the nature of the soil to be cultivated.

The improvement also aims to provide a clevis of novel construction which will admit of the lateral shifting of the draft and the vertical adjustment of the direct application of the said draft, as may be required, to attain the required depth of cultivation and the lateral inclination of the cultivator-shovels.

With these ends in view and such others as are incident to the peculiar construction and combination of the component parts the improvement consists of the novel features which hereinafter will be more particularly set forth and claimed, and which are illustrated in the accompanying drawings, in which—

Figure 1:
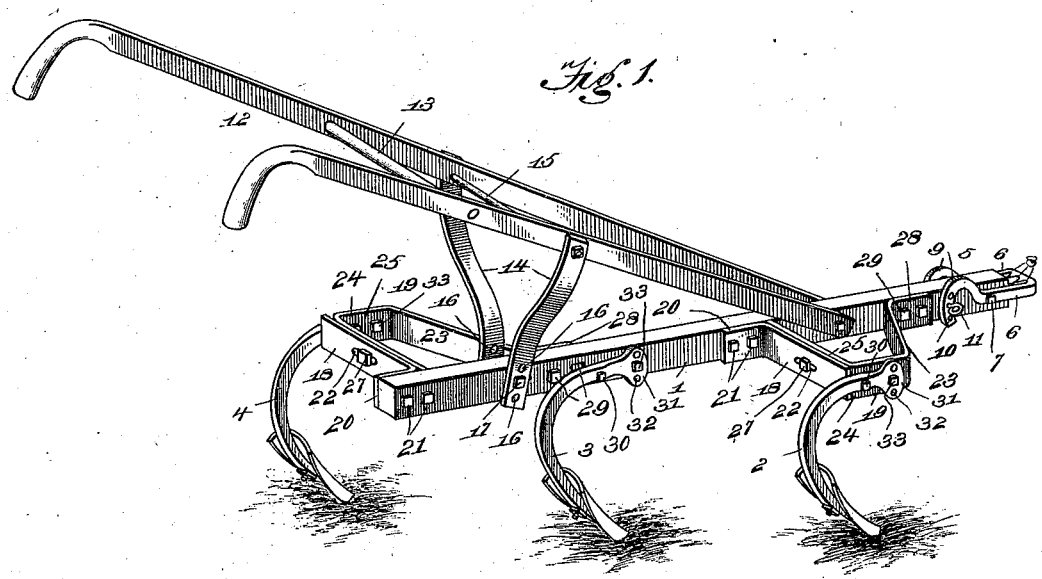
Figure 2:
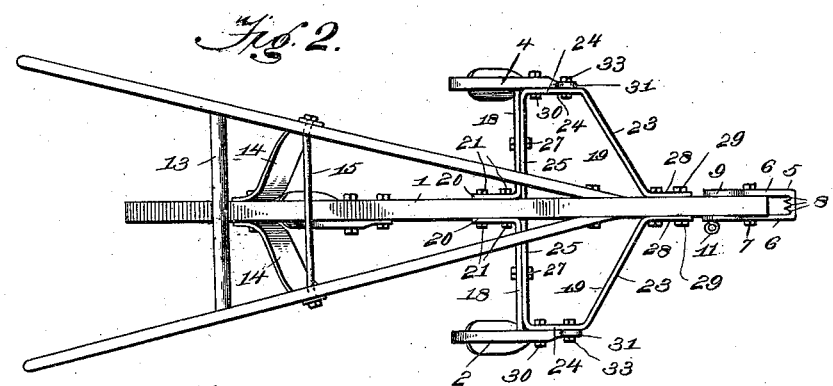
Figure 3:
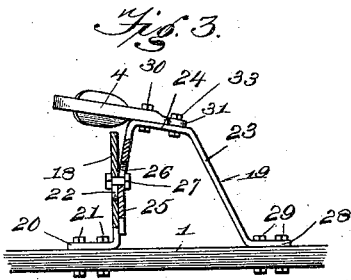
Figure 4:
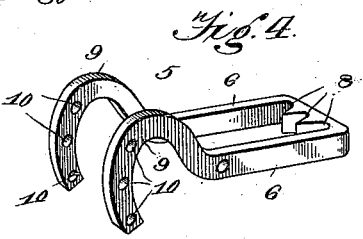

Figure 1 is a perspective view of a cultivator constructed in accordance with and embodying the essence of the invention. Fig. 2 is a top plan view of the improved implement, showing an adjusted position of the rear standard and its mountings. Fig. 3 is a detail view showing the lateral adjustment of the cultivator-standard. Fig. 4 is a detail view of the clevis.

The draft or main beam 1 may be of suitable construction usual in implements of the class to which the present invention belongs, and is preferably an iron or steel beam of suitable length and provided at intervals with cultivator-standards 2, 3, and 4. The draft attachment is applied to the front end of the beam 1, and consists of a clevis 5, which is approximately U-shaped in plan elevation, the parallel members 6 lying one upon each side of the beam 1 and secured thereto by a pivot or bolt 7. The front crossbar of the clevis is notched on its inner edge to provide a series of seats 8 for the reception of the ring by means of which the draft is attached to the implement. The rear end portions of the members 6 curve upwardly and downwardly, as shown at 9, and the rear curved portions have a series of openings 10, which register and are adapted to receive a pin 11, passing transversely through the beam and corresponding openings 10 of the curved portions of the clevis. By this means the front end of the clevis is adapted to be raised and lowered to regulate the depth at which the cultivator-shovels will penetrate the ground. The openings 10 occur in the arc of a circle whose center coincides with the pivot or bolt 7, thereby admitting of the adjustment of the clevis in the manner set forth.

The handles 12 are pivotally connected at their lower ends to the front end portion of the beam 1 and incline rearwardly and upwardly, and are connected near their upper ends by a cross-bar 13. Braces 14 are pivotally connected to the handles by a cross-rod 15, and have their lower end portions brought together and provided with a series of openings 16 to receive a bolt 17, by means of which the said lower ends of the braces are connected with the rear end portion of the beam in such a manner as to admit of the vertical adjustment of the rear ends of the handles 12 to adapt the latter to the convenience and comfort of the farmer.

The mountings for the front and rear standards, 2 and 4, are similar. Hence a detailed description of the one will suffice for both. These mountings consist, essentially, of two brackets 18 and 19. The bracket 18 has its inner bent portion 20 secured to the beam by bolts 21 and is provided with a longitudinal slot 22. The bracket 19 comprises an oblique portion 23, an outer portion 24, parallel with the beam 1, and an inner extension 25, which latter is adapted to lie against the outer portion of the bracket 18 and has a longitudinal slot 26 to coincide with the slot 22 of the said bracket 18 for the passage of a clamp-bolt 27, by means of which the two brackets 18 and 19 are held relatively in the located position. The oblique portion 23 has a forward extension 28, which comes against the side of the beam 1 and is secured thereto by means of bolts 29 in the ordinary manner.

The two brackets 18 and 19 are constructed from strap-iron, which is essential to admit of the lateral adjustment of the standards attached thereto. The inner end portions of these brackets are firmly attached to the draft-beam, and when adjusting the standards laterally the clamp-bolts 27 are loosened and the said standards forced outward, thereby causing the said brackets to spring near their points of attachment with the said draft-beam.

The standards 2, 3 and 4 will be of similar construction and attached to their respective parts in precisely the same manner, preferably by a bolt 30, which passes through the respective standards near their front ends and the parts to which the said standards are to be attached. These bolts 30 form pivots for the standards to tilt upon when adjusting them to change their relative pitch. The front ends of the standards are expanded vertically, as shown at 31, and are provided with a series of openings 32 to receive bolts 33, by means of which the said standards are held when tilted to the required position. The front and rear standards are attached to the outer portions 24 of the respective brackets 19 and the middle standard, 3, is attached directly to the beam 1 at a point midway between the front and rear standards.

The standard 2 is located to the right of the beam 1 and the standard 4 to the left, thereby providing for the disposition of the said standards in a progressive series, so that the furrow made by the standard 2 will be closed by the furrow made by the cultivator-shovel on the standard 3, which furrow, in turn, will be covered by the cultivator-shovel of the rear standard, 4.

In treating some soil it may be advantageous to have the standards 2 and 4 oppositely disposed. To effect this the rear mountings are detached from the beam 1 and brought forward and secured to the beam near its front end by the same fastening-bolts which attach the mountings of the front standard to the said beam. This construction is shown plainly in Fig. 2.

In adapting the cultivator for different soils it is manifest that changes in the form, proportion, and the minor details of construction may be resorted to without departing from the principle or sacrificing any of the advantages of this invention.

Having thus described the invention, what is claimed as new is—

1. In a cultivator, the combination with the draft-beam and a cultivator-standard, of a mounting for the said cultivator-standard comprising two bracket portions which are secured at their inner ends to the said draft-beam and project laterally therefrom, one bracket capable of lateral adjustment by being sprung from a normal position and formed of an oblique portion, an outer portion parallel with the beam, and having the standard attached thereto, and an inner extension, the other bracket comprising a straight portion which lies close against the said inner extension, and a clamp-bolt passing through coincident slots in the said brackets, whereby the latter are held in the relative located adjusted position, substantially as set forth.

2. The herein shown and described cultivator, comprising a main beam provided at its front end with an adjustable clevis, handles pivotally connected with the beam near its front end, braces adjustably connecting the handles with the rear end portion of the beam, front and rear mountings attached to opposite sides of the beam, each comprising brackets which are firmly attached at their inner ends to the beam, one bracket having an oblique portion, an outer portion parallel with the beam, and an inner extension, and the other bracket being straight and coming opposite the inner extension of the aforesaid bracket, clamp-bolts for adjustably securing the opposing portions of the brackets in an adjusted position, and front, rear and middle cultivator-standards secured, respectively, to the front and rear mountings and the said beam upon pivotal bolts, and means for securing the said standards in an adjusted tilted position, substantially as set forth.

In testimony that we claim the foregoing as our own we have hereto affixed our signatures in the presence of two witnesses.

GEORGE H. PARKER.
JOHN G. PARKER.

Witnesses:
WALTER J. BROWN,
WILLIAM N. GRIFFITH.